July 23, 1957
B. A. BUTLER ET AL
2,800,221
SCRAPING TOOL KIT
Filed June 14, 1956
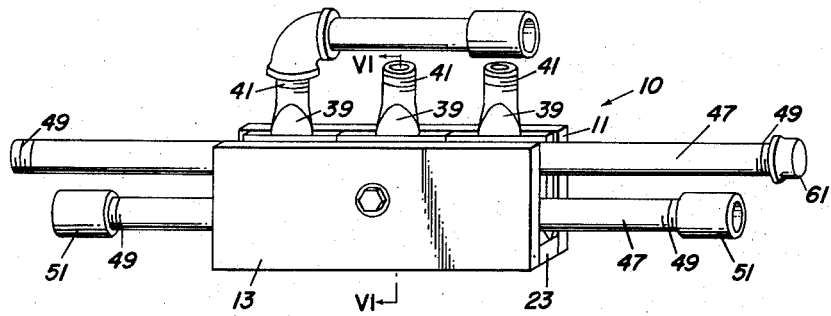
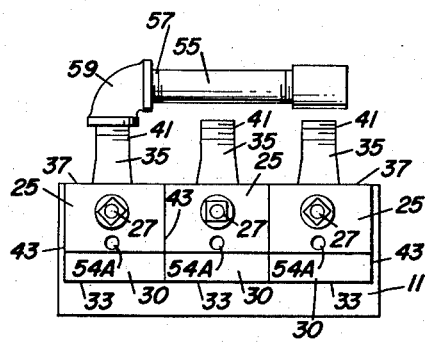
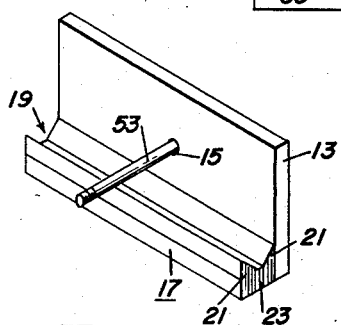
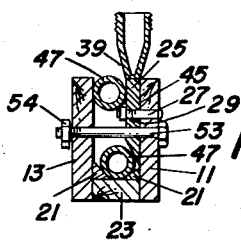
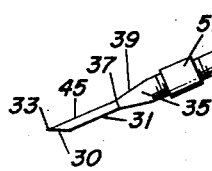
INVENTORS,
BENNIE A. BUTLER
WILLIAM J. BUTLER
BY
Weatherford & Weatherford
attys

2,800,221
SCRAPING TOOL KIT

Bennie A. Butler and William J. Butler, Memphis, Tenn.

Application June 14, 1956, Serial No. 591,329

4 Claims. (Cl. 206—16)

This invention relates to a scraping tool kit and the scraping tool assembled therefrom. In particular, it relates to a kit assembly which is compact in form for ease in carrying to and from the work area, and from which may be assembled a handy scraping tool particularly useful for scraping floors to smooth the same, or for removing any substances as linoleum, asphalt tile, paint, and the like.

The principal object of the present invention is to provide a novel scraping tool kit easily assembled into a scraping tool.

A further object is to provide novel carrying means for such a kit, in which the tool parts are clamped between two board-like members and a detachable handle is coupled to one of the tool blades.

A further object is to provide a scraping tool comprising a scraping blade and pipe sections coupled together, said tool being characterized by simplicity in construction and being readily convertible into a long handle tool or a short handle tool, as desired by the user.

The means by which the foregoing and other objects of the present invention are accomplished and the manner of their accomplishment will be readily understood from the following specification upon reference to the accompanying drawings, in which:

Fig. 1 is a perspective view of the scraping tool kit in carrying disposition.

Fig. 2 is a side elevational view of the same with parts removed for purposes of illustration.

Fig. 3 is a perspective view of one of the board-like members which forms the casing for the scraping tool.

Fig. 4 is a side elevational view of the other board-like members.

Fig. 5 is a side elevational view on a reduced scale of the assembled scraping tool, illustrating its manner of use.

Fig. 6 is a sectional view taken as on the line VI—VI of Fig. 1.

Referring now to the drawings in which the various parts are indicated by numerals, the tool kit of the present invention, generally designated by the numeral 10, comprises a pair of rectangular matching board-like members 11, 13. Members 11, 13 are preferably formed of wood or the like and are bored to provide an aperture 15 in each of the members, the apertures being in alinement when the members are placed in side-by-side relationship. One of the members, as member 11, is further bored to provide a plurality of additional apertures 16.

An elongated section 17 having a V-shaped groove 19 extending throughout the length thereof is fixedly attached adjacent the lower edge of board-like member 13. Elongated section 17 may be formed of any suitable material, as wood or the like, and may be formed in three portions as illustrated in the present drawings, wherein it will be seen two upper portions 21 of triangular cross-section are fixedly attached to the upper surface of a base portion 23 to form V-shaped groove 19. Portions 21, 23 may be attached to one another and to board-like member 13 by any suitable means, as by nailing or gluing.

A plurality of tool scraping blades 25 are removably attached to the inner face of board-like member 11, as by bolt and nut means 27, with the bolts thereof respectively extending through apertures 29 provided in blades 25, and through additional apertures 16 which are in alinement with apertures 29.

Each of blades 25 is preferably formed of a flat rectangular piece of metal, as steel or the like, with the blade being tapered as at 30 adjacent the forward edge along lower side 31 thereof to form a sharpened forward edge 33. A stud 35 is attached adjacent one end thereof to the rearward edge 37 of blade 25, as by welding or the like. The end of stud 35 adjacent blade 25 is preferably flattened as at 39 so as to conform with the thickness of blade 25. The other end of stud 35 is provided with external threading as at 41. In attached position on member 11, the adjacent side edges 43 of blades 25 are in abutment, and upper sides 45 of blades 25 are in abutment with the inner face of board-like member 11, whereby the tapered portions 30 of the blades are in alinement to accommodate other parts of the kit, as will be more apparent in the following description.

Tool kit 10 additionally comprises pipe sections 47 which are herein shown as two in number, although it will be understood that more pipe sections may be provided if desired. The inexpensive construction of the tool kit of the present invention is apparent when it is realized that pipe sections 47 may be formed from standard size plumbing pipes or the like. The opposite ends of pipe sections 47 are provided with external threading, as at 49, and internally threaded pipe couplings 51 are provided to join the ends of the pipe sections in a manner as hereinafter described.

In the carrying disposition of kit 10, best illustrated in Fig. 1, pipe sections 47 are clamped between board-like members 11, 13 by means of a bolt 53 and nut 54, with bolt 53 extending through apertures 15 and an additional aperture 54A provided in blade 25. One of the pipe sections 47 is disposed above bolt 53, and the other pipe section is disposed below the bolt and seated in V-shaped groove 19, with the tapered portions of blades 25 providing space therefor, being clamped thereagainst and limiting upward movement of the lower section 47.

A length of pipe 55 provided with external threading 57 at one end thereof is coupled by means of an internally threaded right angle elbow coupling 59 to one of studs 35, preferably one of the studs disposed at one end of the tool kit 10. Pipe 55 is positioned substantially in parallel relationship with pipe sections 47, whereby to provide a convenient detachable handle means for carrying the tool kit 10 to and from the work area.

When it is desired to use the scraping tool of the present invention the tool kit 10 is disassembled by unfastening the bolt and nut means thereon and by removing the handle means 55. Then the pipe sections 47 and one of the blades 25 are assembled as illustrated in Fig. 5, wherein it will be seen that the pipe sections 47 and stud 35 are disposed in end-to-end relationship and joined together by couplings 51.

Additionally, an internally threaded cap 61 may be threadedly engaged on the end of pipe section 47 remote from blade 25.

In using the scraping tool, the tapered portion 30 is preferably placed next to the floor or surface to be scraped, as best illustrated in Fig. 5.

It will be understood that the scraping tool is very flexible by virtue of the fact that sections of pipe 47 may be detached for working in close places, or if desired, sections may be added. Additionally, it will be understood that handy replaceable blades are provided in the tool kit 10 in the event that the blade being used becomes dull.

From the foregoing it will be understood that the present invention provides a handy floor scraping tool kit which is compact and convenient to carry, and which may be assembled into a novel and versatile floor scraping tool.

We claim:

1. A scraping tool kit comprising a pair of board-like members, a longitudinally extending section fixedly attached to one of said board-like members adjacent the lower edge thereof, said section being grooved to form a V-shaped groove extending longitudinally along the length thereof, at least one scraping tool blade, and upstanding stud fixedly attached to said blade, said blade being bored to provide apertures therein, a pair of pipe sections adapted to be coupled in end-to-end relationship with one another and said stud to form a scraping tool, bolt means removably holding said board-like members in clamping disposition with said pipe sections and said blade clamped therebetween to form a compact scraping tool kit, said bolt means extending through one of the apertures in said blade, said pipe sections being disposed in said kit in parallel spaced relationship on opposite sides of said bolt means and with one of said sections being seated in said longitudinal groove, additional pipe means coupled to said stud and disposed substantially parallel with said pair of pipe sections to provide carrying means for said kit.

2. A scraping tool kit comprising a pair of board-like members, at least one scraping tool blade, an upstanding stud fixedly attached to said blade, said blade being bored to provide apertures therein, a pair of pipe sections adapted to be coupled in end-to-end relationship with one another and said stud to form a scraping tool, bolt means removably holding said board-like members in clamping disposition with said pipe sections and said blade therebetween to form a compact scraping tool kit, said bolt means extending through one of the apertures in said blade, said pipe sections being disposed in said kit in parallel spaced relationship on opposite sides of said bolt means, additional pipe means coupled to said stud and disposed substantially parallel with said pair of pipe sections to provide carrying means for said kit.

3. A scraping tool kit comprising a pair of board-like members, a longitudinally extending section fixedly attached to one of said board-like members adjacent the lower edge thereof, said section being grooved to form a V-shaped groove extending longitudinally along the length thereof, at least one scraping tool blade, a pair of pipe sections adapted to be coupled together and with said blade to form a scraping tool, bolt means removably holding said board-like members in clamping disposition with said pipe sections and said blade therebetween to form a compact scraping tool kit, said pipe sections being disposed in said kit in parallel spaced relationship and with one of said sections being seated in said longitudinal groove.

4. A scraping tool kit comprising a pair of board-like members, a longitudinally extending section fixedly attached to one of said board-like members adjacent the lower edge thereof, said section being grooved to form a V-shaped groove extending longitudinally along the length thereof, a plurality of scraping tool blades removably fixed to one of said board-like members, upstanding studs respectively fixedly attached to said blades, a pair of pipe sections adapted to be coupled in end-to-end relationship with one another and one of said studs to form a scraping tool, means removably engaging said board-like members to clamp said pipe sections and said blades between said board-like members with one of said pipe sections seated in said V-shaped grove to form a compact scraping tool kit, handle means engaging one of said upstanding studs to provide carrying means for said kit.

References Cited in the file of this patent
UNITED STATES PATENTS

| Number | Name | Date |
|---|---|---|
| D. 115,353 | Thomas | June 20, 1939 |
| 160,969 | Taft | Mar. 16, 1875 |
| 1,073,565 | Biehl | Sept. 16, 1913 |
| 1,318,007 | Gau | Oct. 7, 1919 |
| 1,837,751 | Bennett | Dec. 22, 1931 |
| 2,504,405 | Fletcher | Apr. 18, 1950 |
| 2,522,213 | Doniger | Sept. 12, 1950 |
| 2,554,680 | Morris et al. | May 29, 1951 |